United States Patent
Seckel

(10) Patent No.: US 6,732,774 B1
(45) Date of Patent: May 11, 2004

(54) MULTI-PURPOSE FARM APPARATUS

(76) Inventor: Gary J. Seckel, 911 Gallaher Rd., Labanon, OH (US) 45036

( * ) Notice: Subject to any disclaimer, the term of this patent is extended or adjusted under 35 U.S.C. 154(b) by 184 days.

(21) Appl. No.: 09/240,197

(22) Filed: Jan. 29, 1999

(51) Int. Cl.⁷ .............................. B27M 1/08; B27C 9/00; B65B 13/02; B23Q 15/00
(52) U.S. Cl. ................ 144/3.1; 144/4.6; 144/192; 144/195.1; 144/365; 144/366; 144/367; 144/382; 29/426.2; 100/3; 100/8; 100/192; 241/101.76
(58) Field of Search .............................. 29/426.2, 426.3; 83/399, 468; 100/3, 8, 192; 144/3.1, 4.6, 192, 193.1, 195.1, 365, 366, 367, 382; 241/30, 101.76

(56) References Cited

U.S. PATENT DOCUMENTS

| | | | |
|---|---|---|---|
| 173,965 A | | 2/1876 | Jones |
| 3,657,999 A | | 4/1972 | White .......................... 100/192 |
| 3,779,295 A | * | 12/1973 | Balsbaugh ............... 144/193 A |
| 4,163,524 A | * | 8/1979 | Lundhal et al. ................ 241/30 |
| 4,219,057 A | * | 8/1980 | Falk ........................... 144/3 K |
| 4,437,502 A | | 3/1984 | Staver ..................... 144/193 A |
| 4,467,712 A | * | 8/1984 | Fincham ......................... 100/8 |
| 4,503,894 A | | 3/1985 | Gratkowski ............. 144/193 A |
| 4,930,386 A | * | 6/1990 | Laskowski et al. ............ 83/399 |
| 5,249,350 A | * | 10/1993 | Callahan .................... 29/426.2 |
| 5,408,907 A | * | 4/1995 | Mains ........................... 83/468 |

* cited by examiner

*Primary Examiner*—Joseph J. Hail, III
(74) *Attorney, Agent, or Firm*—Mark F. Smith; Smith Brandenburg Ltd.

(57) ABSTRACT

A multi-purpose farm apparatus capable of being easily transported and which can be used to perform a variety of tasks. The multi-purpose farm apparatus comprises a trailer, a combination baler and wood splitter and a hydraulic system mounted thereon. The combination baler and log splitter apparatus includes a baling portion having a baling chamber and a first gib assembly comprising a pressure platen and is mounted for reciprocal movement within said baling chamber. The combination baler and log splitter apparatus further includes a log splitting portion having a second gib assembly comprising a splitting wedge and is mounted to said trailer for reciprocal movement. The first gib assembly and the second gib assembly are mechanically coupled to the hydraulic system for effecting reciprocating movement of the first gib assembly and the second gib assembly. The hydraulic system further comprises a hydraulic motor for driving various farm machinery.

26 Claims, 14 Drawing Sheets

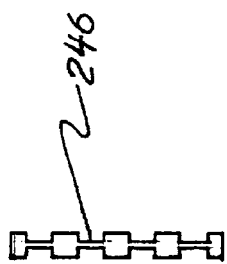
FIG. 7
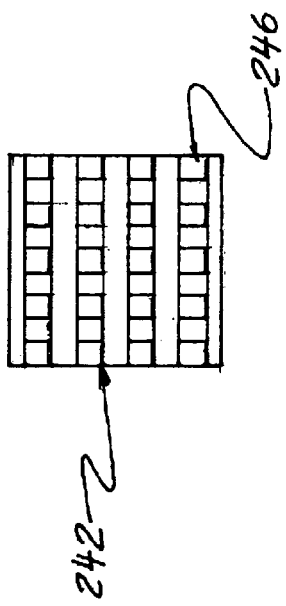
FIG. 8
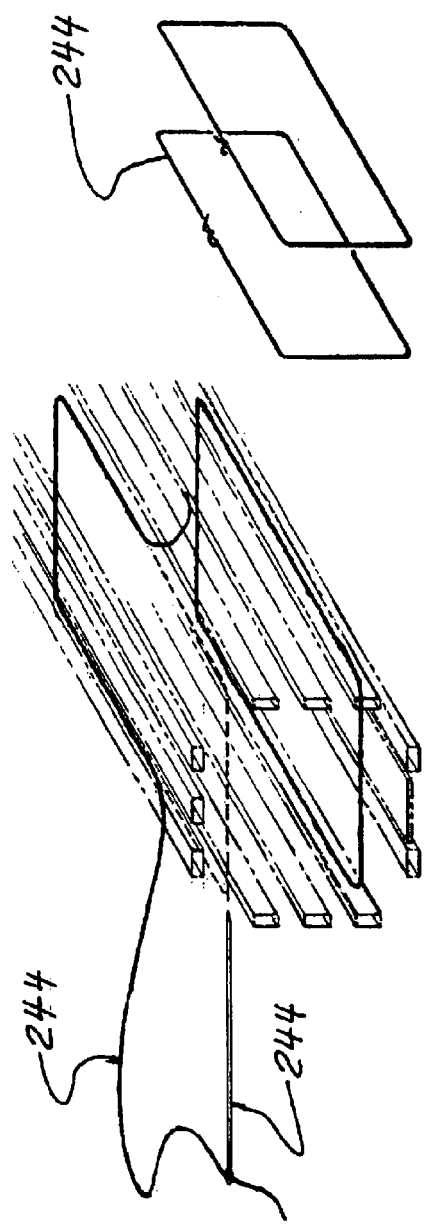
FIG. 6
FIG. 5

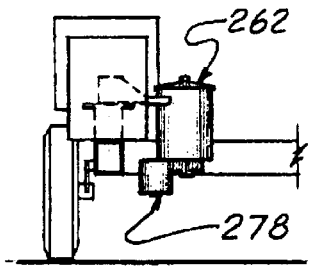
FIG. 15
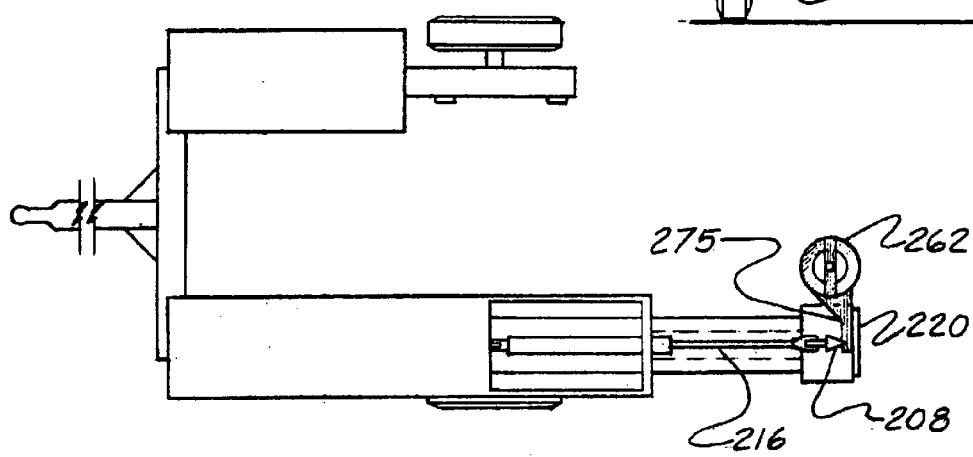
FIG. 14
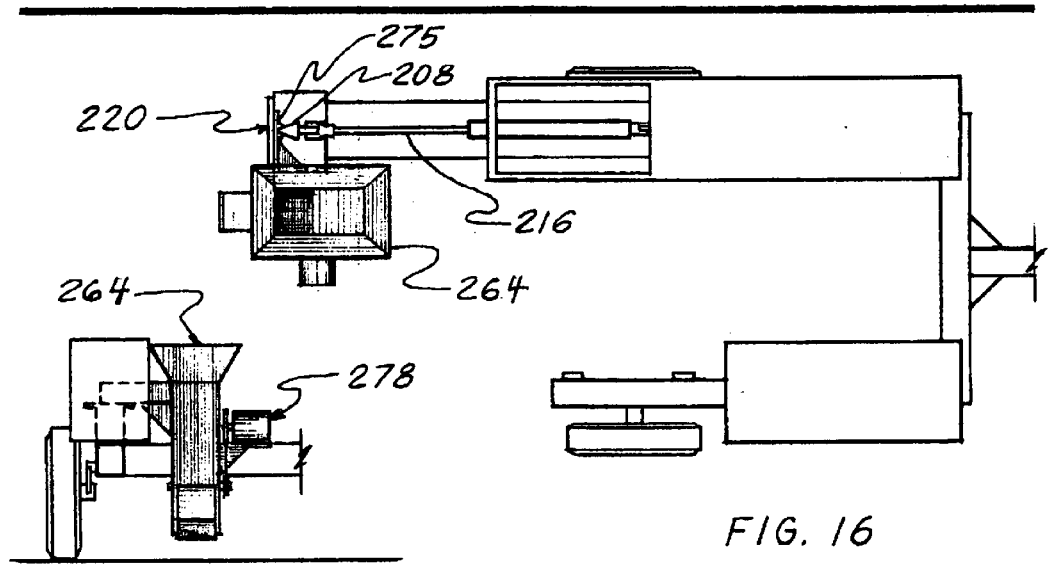
FIG. 16
FIG. 17

FIG. 19
FIG. 18
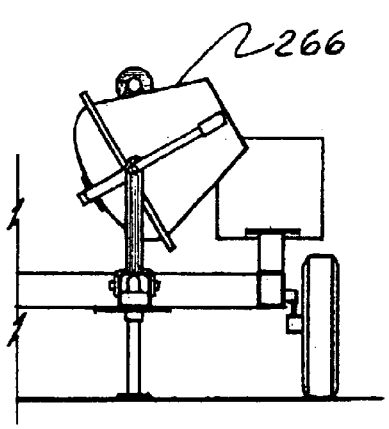
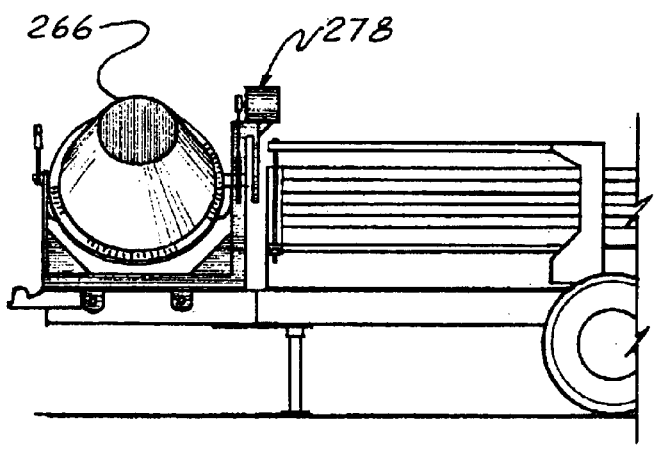
FIG. 20
FIG. 21
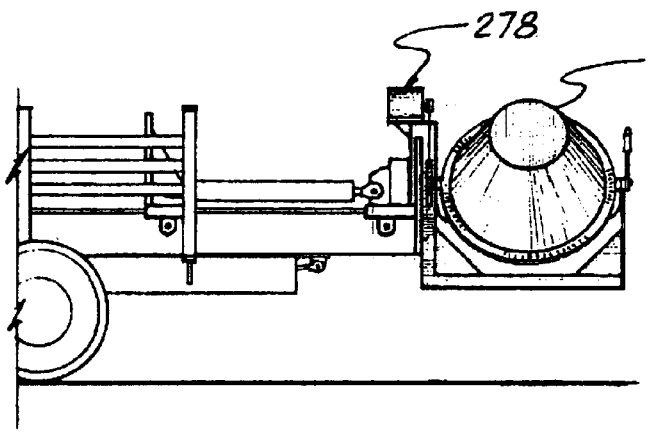
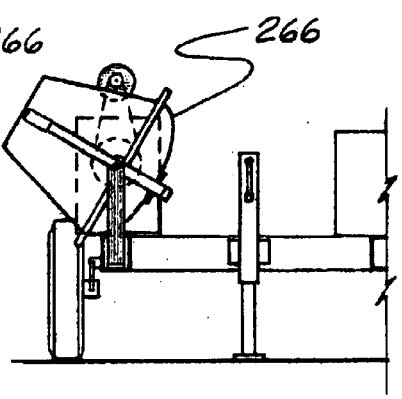

FIG. 22
FIG. 23
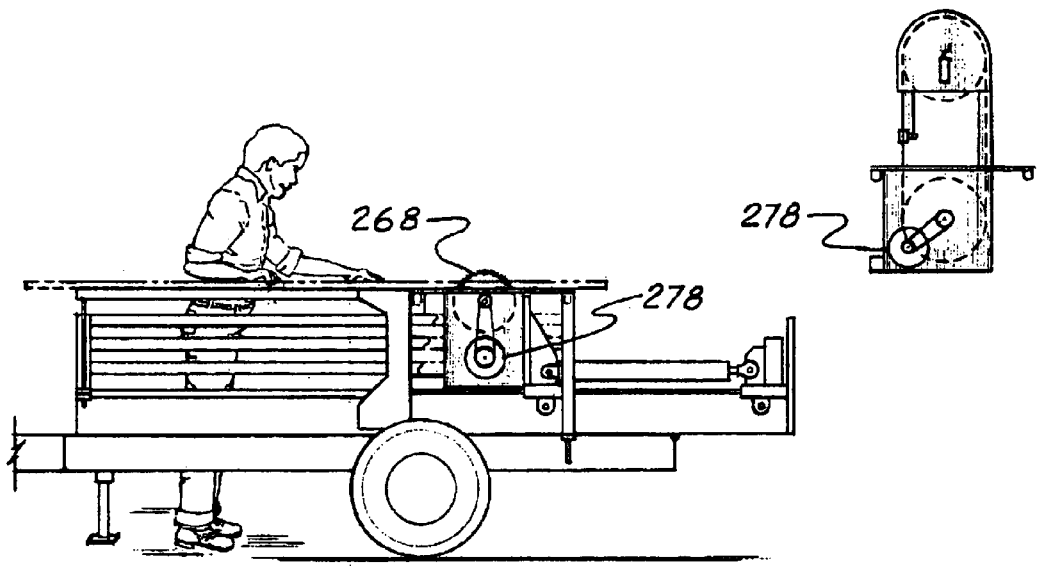
FIG. 24
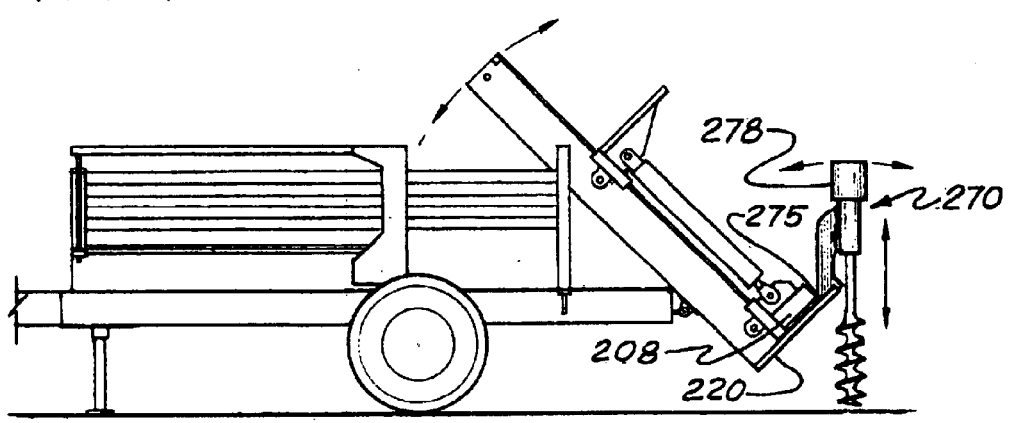

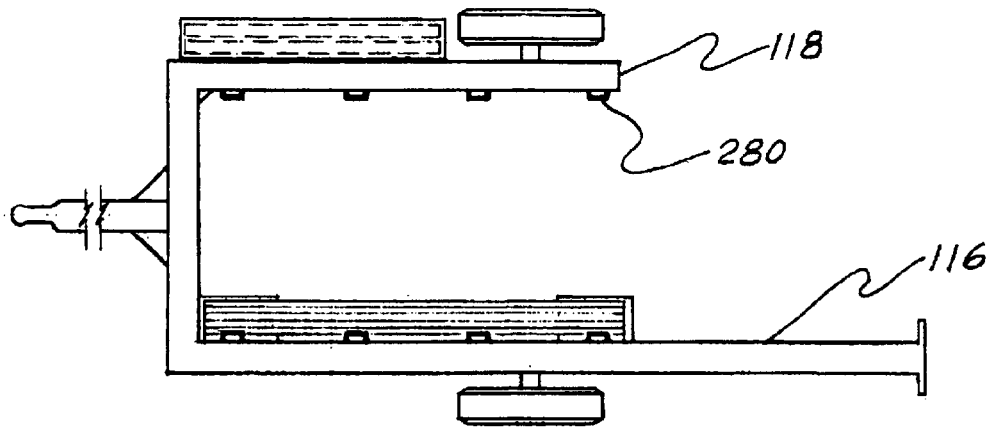
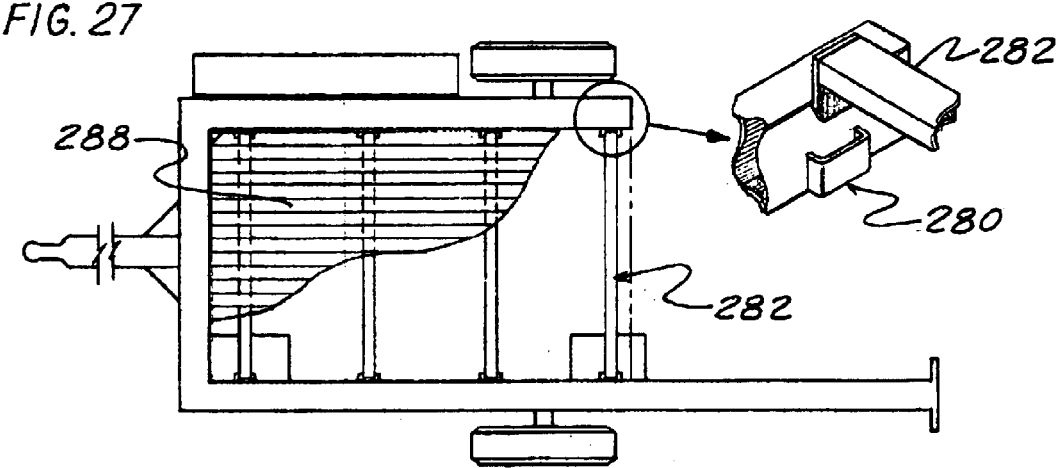
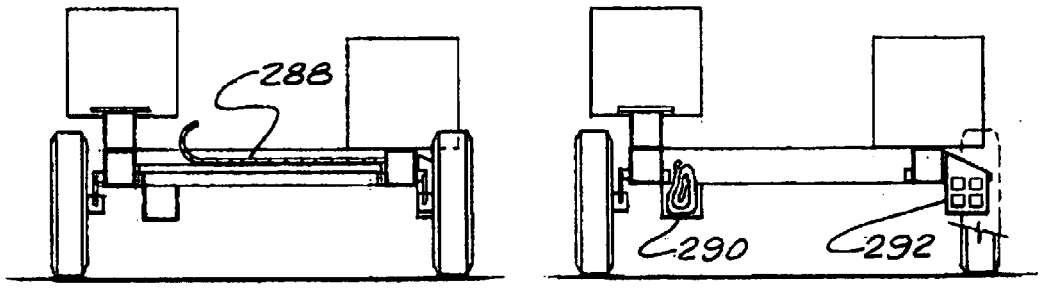

MULTI-PURPOSE FARM APPARATUS

BACKGROUND OF THE INVENTION

The present invention is directed to farm apparatus, and more particularly, to a multi-purpose farm apparatus capable of being easily transported and having a hydraulic system which can be used to drive various farm equipment including a combination baler and wood splitter.

Small farms are a positive influence in society and preserve open space and contribute to the rural economy. Historically, farmers operating small farms have shared their strategies for survival through a network of co-ops and local organizations that, for the most part, either no longer exist or have become part of large agricultural business concerns. This has contributed to the recent decline of small independent farms. In 1930, for example, there were more than seven million small farms. Today it is estimated that the number of small farms has dropped to less than 500,000. This decline of the small farm, along with local distribution networks, has created greater pressures on farmers through a food supply system dominated by large business organizations. Governments responding to such pressures have reacted by subsidizing larger production and distribution operations, which in turn, have resulted in the formation of a large agricultural business industry making it increasingly more difficult for small farms to compete In order for small farms to effectively compete in such a large agricultural business industry, farmers operating small farms must use their management skills to reduce expenses, such as reducing the need to purchase expensive equipment, while increasing farm productivity and the value of their production. Accordingly, a need exists for low-cost technologies that enable farmers to reduce expenses and maintain or improve productivity. This can partially be achieved by the development of relatively low-cost equipment that can be utilized to perform a variety of functions.

Farmers operating small farms are often required to clear wooded areas to increase planting acreage or to remove dead or dying trees. Since wood can be an alternative energy source for supplemental or even primary space heating, it has become increasing more valuable. Further, wood gathered and processed by the farmer may be used as an additional source of income. Typically, in order to sell such wood, the farmer will cut the tree into 18 to 20 inch lengths, and then split the logs for use as firewood.

Apparatuses for splitting logs are well known in the art. Conventional log splitting devices comprise a wedge-shaped blade that is driven by a hydraulic ram into the log to split the log into two or more pieces to facilitate burning. The split pieces can then be easily transported for sale or use. For a typical small farm the splitting of logs can be accomplished in a few days. Accordingly, since the wood splitting equipment is only operated for short amounts of time, the purchase of such stand alone equipment ties up needed capital.

Farmers having livestock that are over-wintered are required to either produce hay or they must purchase it from others. Since the cost to purchase bales of hay is often economically unfeasible for many small farms, farmers having livestock must grow and bale hay themselves. Various types and sizes of agricultural crop balers are known in the agricultural industry. One form of agricultural baler produces large round bales of approximately four to five feet in width and of a similar diameter. While such bales have good field storage characteristics, they are difficult to handle. Therefore., many farmers operating small farms prefer a type of agricultural baler that produces rectangular-shaped bales of approximately three to four feet in length and one to one-in-a-half feet in width. Such bales are more easily stacked and are more suitable to manual handling.

In recent years, straw bales are again being utilized as an inexpensive though highly energy-efficient building material and have been shown to be a relatively low cost method of construction and can increase the rate of production of dwellings being built by non-trade persons. Further, dwellings constructed using straw bales generally display better insulation and fire resistance characteristics than conventionally constructed dwellings.

While the baling of straw or hay for a small farm can generally be accomplished in a short amount of time, farmers must either give half of the bales produced to the person who bales for others or purchase his own baling equipment. Unfortunately, the cost to purchase and maintain agricultural baling equipment is very expensive and economically unfeasible for the small farm. Furthermore, as with wood splitting equipment, baling equipment is only operated for short amounts of time and the purchase of such stand-alone equipment again ties up needed capital.

In addition to processing firewood and baling straw or hay, farmers operating small farms are often required to perform a variety of other tasks such as generating electricity; pumping water; mixing feeds, cement, and the like; operating presses, sawing wood; cutting grasses or crops; chopping or shredding debris, corn kernals, and the like, and other such tasks. Unfortunately, until now, due to the cost of the individual hydraulic motors necessary to operate each piece of equipment, such equipment was either relatively expensive or was not designed for extensive operation such as for farm use. Accordingly, a need exists for a relatively inexpensive, easily maintained, portable farm apparatus that can be used to perform a wide variety of tasks.

SUMMARY OF THE INVENTION

The present invention is directed to multi-purpose farm apparatus that can be used to perform a variety of tasks and comprises a trailer having a portable hydraulic system mounted thereon and which can be used to drive various farm machinery including a combination baler and wood splitter.

In a preferred embodiment of the invention, the multi-purpose farm apparatus comprises a trailer having a trailer hitch for attaching the trailer to a vehicle such as a truck, tractor, or other such means for transporting the multi-purpose farm apparatus to a remote location; means for baling; means for splitting wood, and a hydraulic system for driving the means for baling and the means for splitting wood.

In another preferred embodiment of the invention, the multi-purpose farm apparatus comprises a combination baler and wood splitter.

In another preferred embodiment of the invention, the multi-purpose farm apparatus comprises a hydraulic system comprising a hydraulic cylinder and a piston rod, whereby the hydraulic cylinder is pivotally secured to the trailer such that the hydraulic cylinder may be operated in a first configuration for operating the baling portion of the combination baler and wood splitter and in a second configuration for operating the wood splitting portion of the combination baler and wood splitter.

In another preferred embodiment of the invention, the multi-purpose farm apparatus comprises means for rotating the log splitting portion into a vertical position, a horizontal position, or any position there between.

In another preferred embodiment of the invention, the hydraulic system of the multi-purpose farm apparatus further comprises a hydraulic motor means for driving a variety of farm machinery.

In another preferred embodiment of the invention, the multi-purpose farm apparatus comprises means for mixing.

In another preferred embodiment of the invention, the multi-purpose farm apparatus comprises means for shredding.

In another preferred embodiment of the invention, the multi-purpose farm apparatus comprises means for mixing concrete.

In another preferred embodiment of the invention, the multi-purpose farm apparatus comprises means for sawing.

In another preferred embodiment of the invention, the multi-purpose farm apparatus comprises means for drilling holes.

In another preferred embodiment of the invention, the multi-purpose farm apparatus comprises means for pumping water.

In another preferred embodiment of the invention, the multi-purpose farm apparatus comprises a pressing means.

In another preferred embodiment of the invention, the multi-purpose farm apparatus comprises an air compressor for use in driving power tools and equipment.

In another preferred embodiment of the invention, the multi-purpose farm apparatus comprises a horizontal bed which can be used to support wood, baling material, tools, and the like.

A primary object of this invention is to provide a multi-purpose farm apparatus that can be used to perform a variety of tasks.

Another primary object of this invention is to provide a multi-purpose farm apparatus that is easily transported.

Another primary object of this invention is to provide a multi-purpose farm apparatus having a variety of farm equipment and machinery mounted thereon.

Another primary object of this invention is to provide a multi-purpose farm apparatus having a hydraulic system for driving a variety of farm equipment and machinery.

Another primary object of this invention is to provide a multi-purpose farm apparatus having a hydraulic motor means for driving a variety of farm equipment.

Another primary object of this invention is to provide a multi-purpose farm apparatus that can be used to bale material.

Another primary object of this invention is to provide a multi-purpose farm apparatus that can be used to split wood.

Another primary object of this invention is to provide a multi-purpose farm apparatus that can be used to perform a variety of tasks and which is relatively inexpensive to manufacture.

Another primary object of this invention is to provide a multi-purpose farm apparatus that can be used to perform a variety of tasks and which is relatively inexpensive to operate.

Another primary object of this invention is to provide a multi-purpose farm apparatus that can be used to perform a variety of tasks and which is relatively inexpensive to maintain.

Additional objects and advantages of the invention will be apparent from the following description, the accompanying drawings and the appended claims.

BRIEF DESCRIPTION OF THE DRAWINGS

FIG. 5 is a perspective schematic view showing a method of tying-off a formed bale, FIG. 6 is a schematic view showing another method of tying-off a formed bale;

FIG. 7 is a side view of a divider plate used for separating bales formed by the multi-purpose farm apparatus;

FIG. 8 is a front view of the divider plate of FIG. 7 used for separating bales formed by the multi-purpose farm apparatus;

FIG. 14 is a top schematic view of the multi-purpose farm apparatus of the present invention showing conventional mixing equipment mounted thereon, FIG. 15 is a partial rearward schematic view taken of the multi-purpose farm apparatus of the present invention showing the mixing equipment of FIG. 14;

FIG. 16 is a top schematic view of the multi-purpose farm apparatus of the present invention showing conventional chipping/shredding/hammermill equipment mounted thereon;

FIG. 17 is a partial rearward schematic view of the multi-purpose farm apparatus of the present invention showing the chipping/shredding/hammermill equipment of FIG. 16;

FIG. 18 is a partial side schematic view of the multi-purpose farm apparatus of the present invention showing conventional concrete mixing equipment mounted to the tongue portion thereof;

FIG. 19 is a partial forward view taken of the multi-purpose farm apparatus of the present invention showing the concrete mixing equipment of FIG. 18, FIG. 20 is a partial side schematic view of the multi-purpose farm apparatus of the present invention showing conventional concrete mixing equipment mounted to the anchor plate thereof, FIG. 21 is a partial rear schematic view taken of the multi-purpose farm apparatus of the present invention showing conventional concrete mixing equipment mounted to the anchor plate thereof;

FIG. 22 is a partial side schematic view of the multi-purpose farm apparatus of the present invention showing a conventional table saw or band saw mounted thereon;

FIG. 23 is a partial perspective view taken of the corner portion of the saw table of the table saw or band saw of FIG. 22, FIG. 24 is a partial side schematic view of the multi-purpose farm apparatus of the present invention showing conventional hole drilling equipment mounted thereon;

FIG. 27 is a partial top schematic view of the multi-purpose farm apparatus of the present invention showing a flexible cargo mat supported by a plurality of removable slats;

FIG. 28 is a rearward schematic view of the multi-purpose farm apparatus of the present invention showing the flexible cargo mat of FIG. 27;

FIG. 29 is an enlarged perspective view showing the end flange of a removable slat of FIGS. 27 and 28 and a corresponding support bracket for receiving the end flange, FIG. 30 is a partial top schematic view showing the removable slats and the flexible cargo mat of FIGS. 27 through 29 in their stowed position, and FIG. 31 is a rearward schematic view of the multi-purpose farm apparatus of the present invention showing the removable slats and the flexible cargo mat of FIGS. 27 through 29 in their stowed position.

DETAILED DESCRIPTION OF THE PREFERRED EMBODIMENT

Figure 1:
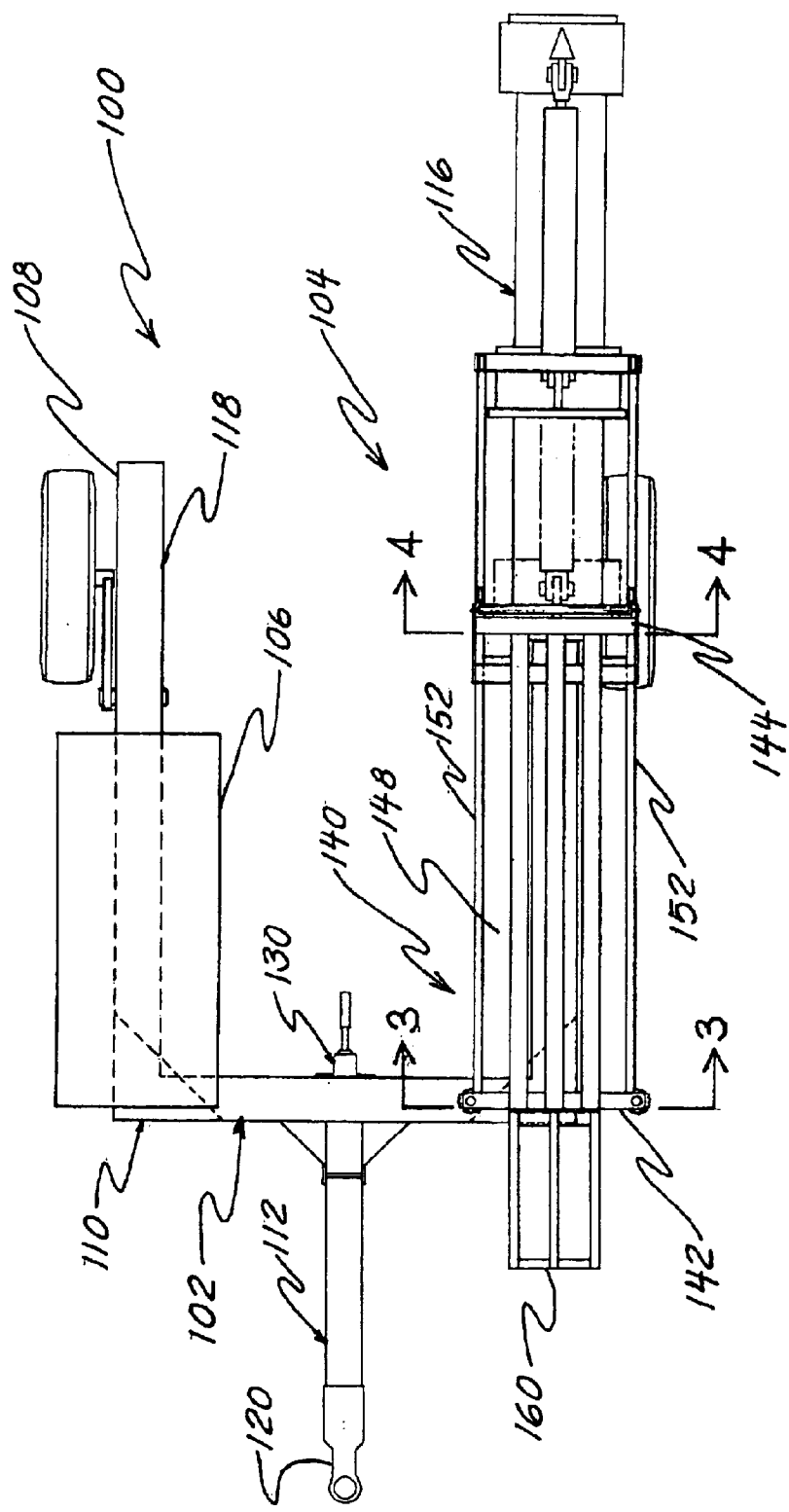
FIG. 1 is a top schematic view of the multi-purpose farm apparatus of the present invention comprising a trailer having a combination baler and wood splitter apparatus mounted thereon.
Figure 2:
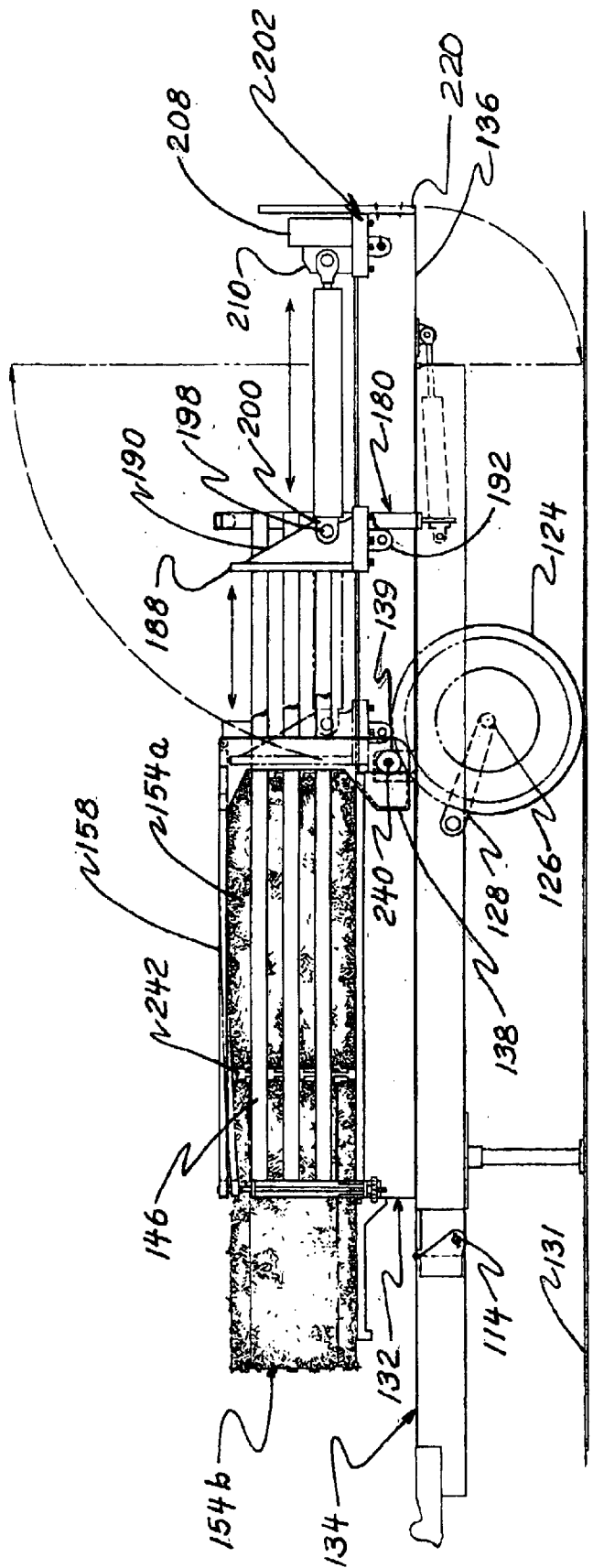
FIG. 2 is a side view of the multi-purpose farm apparatus of FIG. 1 showing the combination baler and wood splitter apparatus in a baling operation configuration.

Referring to FIGS. 1 and 2, a relatively inexpensive, easily portable and maintained multi-purpose farm apparatus of the present invention is shown, generally designated 100, for use in performing a variety of conventional farm tasks The multi-purpose farm apparatus comprises a trailer 102 having a combination baler and wood splitter apparatus, generally designated 104, and a hydraulic system 106, mounted thereon. As will be further described herein below, the multi-purpose farm apparatus 100 further includes means for mounting, driving, and controlling the operation of various conventional farm machinery.

Figure 9:
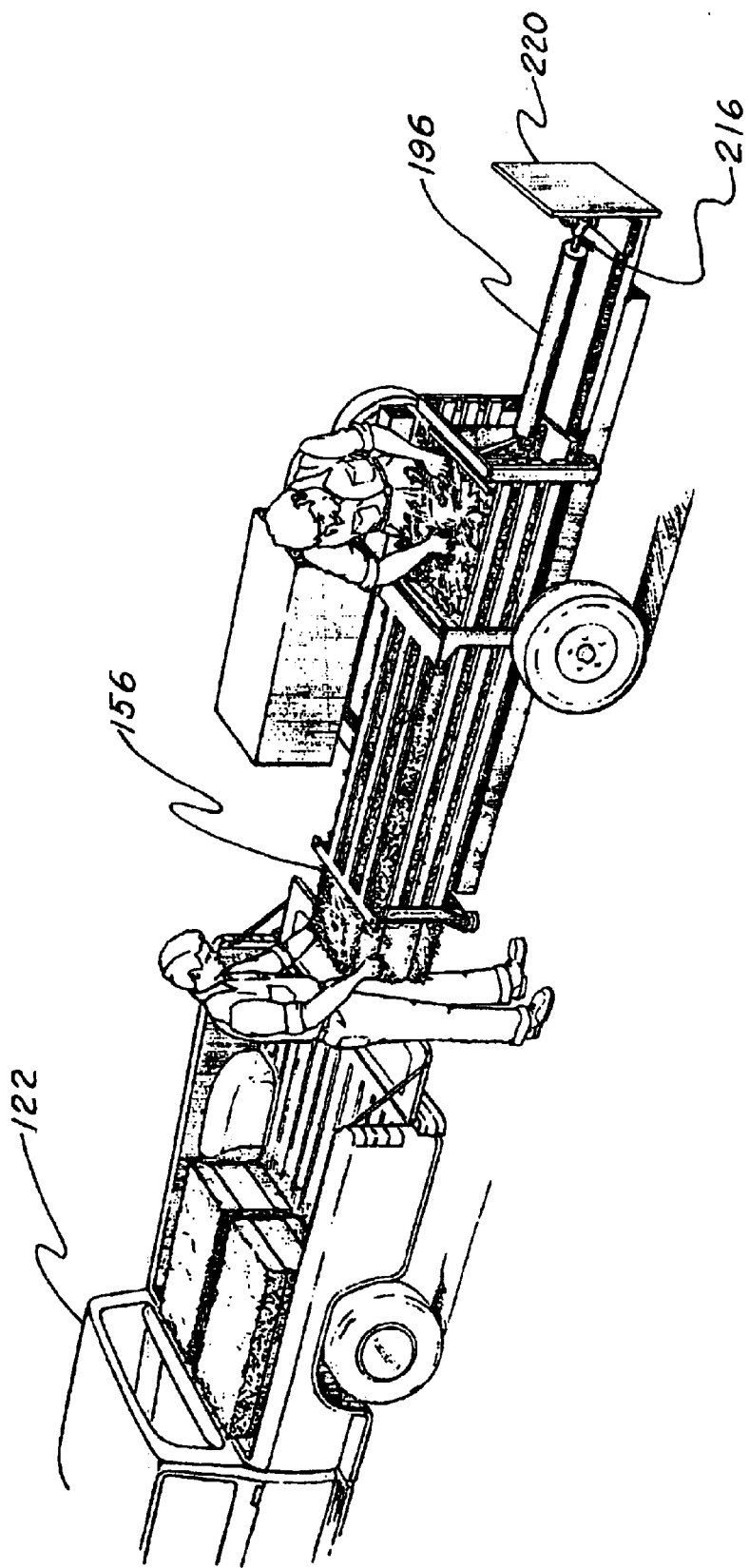
FIG. 9 is a perspective view of the multi-purpose farm apparatus of FIG. 1 showing compressible baling material being inserted into the baling chamber and a formed bale being ejected out through the front opening of the baling chamber.

The trailer 102 comprises a chassis frame 108 having a cross frame 110, a tongue portion 112 extending in a forward direction from the cross frame 110 and pivotally connected thereto by a conventional hinge and pin means 114, and generally parallel first and second horizontal frames 116 and 118, respectively, extending in a rearward direction from the cross frame, 110. The chassis frame 108 is preferably formed of a closed rectangular member, however, other geometric configured members such as I-beams, H-beams, and various shaped tubular members known in the art may be used. Attached to the outer forward end of the tongue portion 112 is a conventional trailer hitch 120 for attaching the trailer 102 to a vehicle such as a truck, tractor, or other such means 122 (FIG. 9). Tires 124, are conventionally mounted to an axle 126 supported between the first and second horizontal frames 116, 118 by hangers 128, or other like means, to support the trailer 102 and cooperate with the trailer hitch 120 to permit the multi-purpose farm apparatus 100 to be easily transported to a remote location. The trailer 102 further includes a conventional hand-operated jack 130 mounted to the chassis frame 108, which can be raised or lowered to support the forward end of the trailer 102 when it is detached from the vehicle 122.

As used herein, the terms "forward" or "forwardly" correspond to the direction directly toward the vehicle 122 transporting the multi-purpose farm apparatus 100, and the terms "rearward" or "rearwardly" correspond to the direction directly away from the vehicle 122 transporting the multi-purpose farm apparatus 100. The terms "upward" or "upwardly" correspond to the direction away from the driving surface 131, and the terms "downward" or "downwardly" correspond to the direction toward the driving surface 131. The terms "horizontal" corresponds to the plane substantially parallel to the driving surface 131 and the term "vertical" refers to the plane substantially perpendicular to the driving surface 131.

Referring also to FIGS. 1 through 4, the combination baler and wood splitter apparatus 104 of the multi-purpose farm apparatus 100 comprises a first rectangular tubular member 132 that rigidly rests on the forward portion of the upper surface 134 of the first horizontal frame 116, and a second rectangular tubular member 136 that rests on the rearward portion of the upper surface 134 of the first horizontal frame 116. The second rectangular tubular member 136 is pivotally mounted thereto by a pair of frame supports 138 such as by a conventional hinge and pin means 139.

Figure 3:
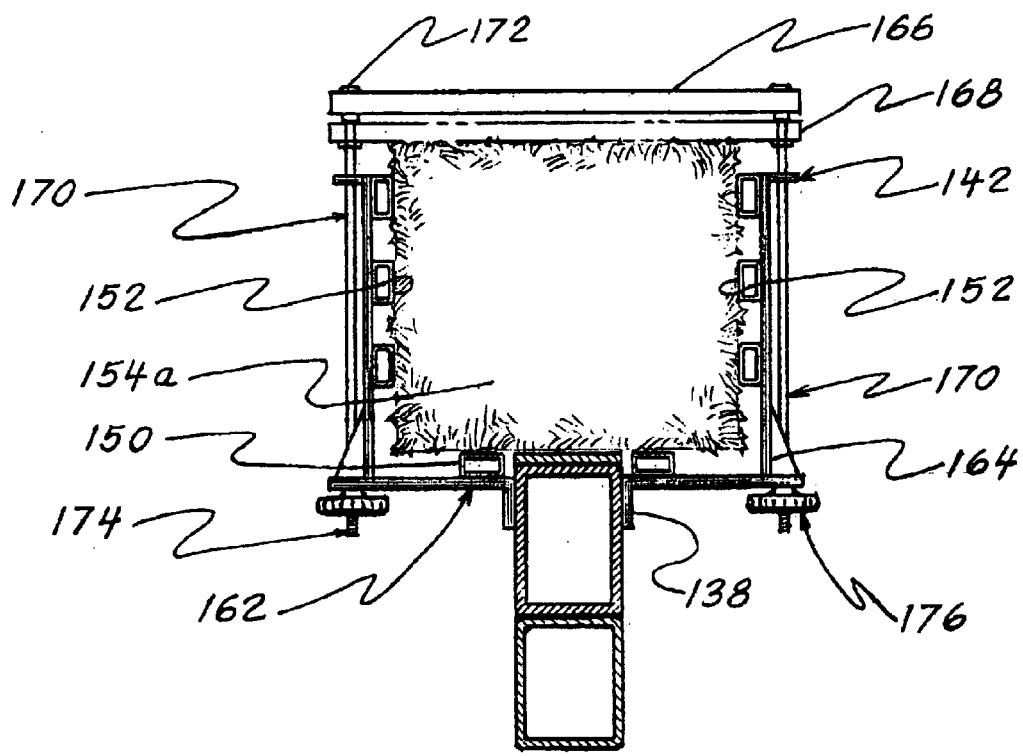
FIG. 3 is a front cross-section view taken along line 3—3 of FIG. 1 showing the forward portion of the baler portion of the multi-purpose farm apparatus showing the adjustable frame member.
Figure 4:
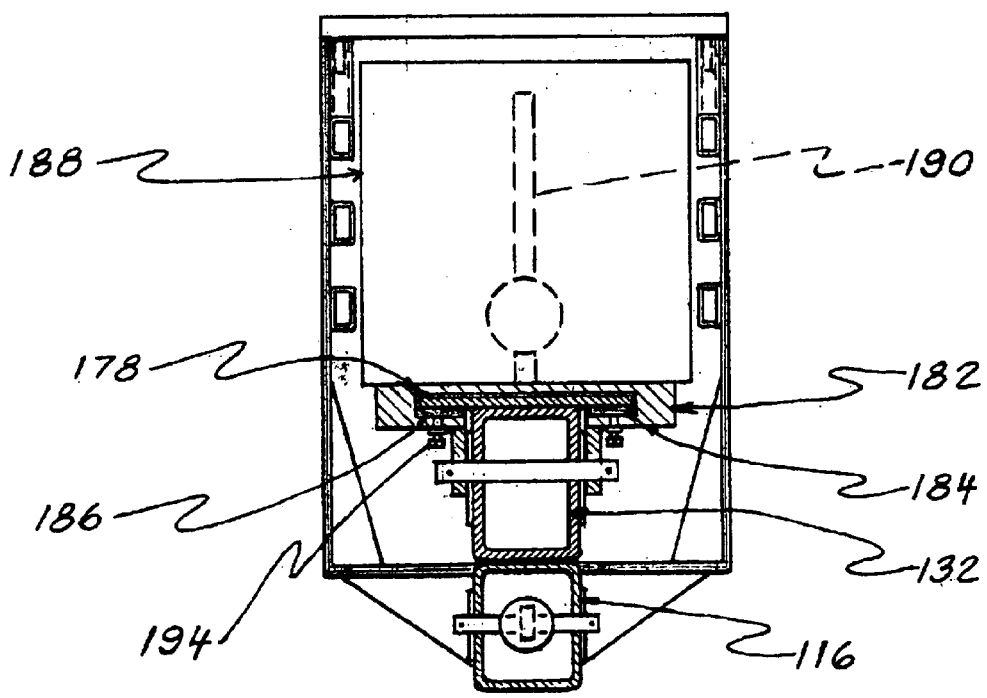
FIG. 4 is a rear cross-section view of the multi-purpose farm apparatus taken along line 4—4 of FIG. 1 showing the slider plate and gib assembly.

The baling portion, generally designated 140, of the combination baler and wood splitter apparatus 104 comprises generally rectangular forward and rearward frames 142 and 144, respectively, having a plurality of spaced apart adjacent rails 146 extending longitudinally there between to form a generally rectangular shaped baling chamber 148 having a floor 150 and sides 152 for constraining a bale 154a laterally, an open forward end 156 (FIG. 9), and a cover 158 covering the forward end of the baling chamber 148. As shown in FIGS. 3 and 4, the generally rectangular forward frame 142 includes a lower frame member 162 for attaching to the frame supports 138, side frame members 164, an adjustable upper frame member 166 and an upper rail support 168 the outer ends of the adjustable upper frame member cover 168 include a threaded aperture for receiving one end of a corresponding shaft 170 which is inserted through corresponding apertures in the upper rail support 168 and rotatably retained therein by an end nut, pin or the like 172. The other end of each shaft 170 includes a threaded portion 174 that is received in and extends through corresponding threaded apertures in the lower frame member 162. The end of each shaft 170 is provided with a knob 176 for manually rotating the shaft 170. Because of the threaded interconnection between the threaded portion 174 of the shaft 170 and the corresponding threaded apertures in the lower frame member 162, rotation of the knobs 176 operate to draw the shafts 170 upwardly or downwardly thereby urging the upper rail support 168 to move upwardly or downwardly laterally adjusting the open forward end 156 of the cover 158 (see FIG. 2) and thereby adjusting the cross section of the baling chamber 148. It should now be apparent to one skilled in the art that by adjusting the cross section of the forward end of the baling chamber 148, the density of the bales formed thereby may be increased or decreased. For example, decreasing the cross section of the open forward end of the baling chamber 148 will result in a bale being more compressed and therefore more dense. Increasing the cross section of the forward end of the baling chamber 148 will result in a bale being less compressed and therefore less dense. Extending outwardly from the forward end of the baling chamber 148 is a bale support 160. The bale support 160 is pivotally secured to the forward end of the baling chamber 148 to permit the bale support 160 to pivot either upwardly or downwardly to reduce the overall length of the multi-purpose farm apparatus 100 during towing and storage Referring to FIGS. 1, 2, 4 and 9, mounted longitudinally along and overhanging the upper surface of the first rectangular tubular member 132 by welding, bolts, or other similar means, is a slider plate 178. A first gib assembly 180 comprises a first carriage 182, having brackets 184 which fit over and slidably engage the overhang portions 186 of the slider plate 178, a first pressure platen 188, a central vertical support 190 extending between the first pressure platen 188 and the first carriage 182, and having a downwardly extending U-shaped cantilever bracket 192. Threaded screws 194 are inserted within corresponding apertures in brackets 184 for contacting and pressing against the slider plate 178 to frictionally adjust the sliding motion of the first gib assembly 180. The central vertical support 190 of the first gib assembly 180 is connected to the end of a double-acting hydraulic cylinder 196 by means of a connecting pin, bolt, or other like means 198 inserted through an aperture in the central vertical support 190 and a corresponding aperture in a clevis 200 that is attached to the end of the hydraulic cylinder 196.

A second gib assembly 202 is similar in design to the first gib assembly 180 and comprises a second carriage 204 for reciprocal movement along the slider plate 178. The second carriage 204 further comprises a splitting wedge 208 and a central vertical support 210 extending between the splitting wedge 208 and the second carriage 204 and includes a downwardly extending U-shaped cantilever bracket 212. Threaded screws 214 are inserted within corresponding apertures in brackets 206 for contacting and pressing against the slider plate 178 to frictionally adjust the sliding motion of the second gib assembly 202. The central vertical support 210 of the second gib assembly 202 is connected to the outer end of the first piston rod 216 of the hydraulic cylinder 196 by means of a connecting pin, bolt, or other like means 218 inserted through an aperture in the central vertical support 210 and a corresponding aperture in the first piston rod 216. Fixedly secured to the rearward end of the second rectangular tubular member 136 by welding, bolts, or other like means, and extending upwardly therefrom is an anchor plate 220. As will be described hereinafter, the anchor plate 220 cooperates with the splitting wedge 208 to split wood logs positioned there between.

Figure 10:
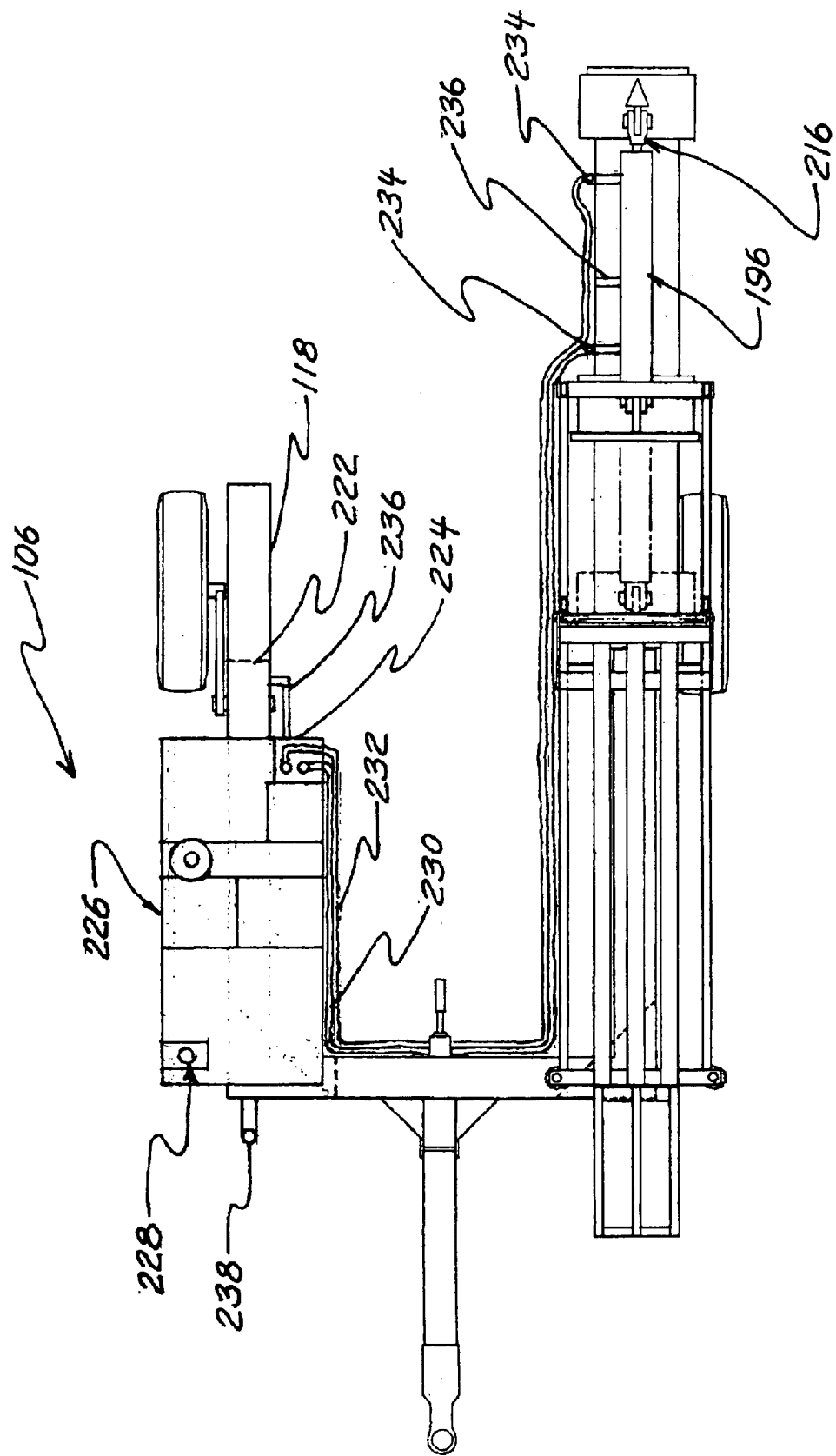
FIG. 10 is a top schematic view of the multi-purpose farm apparatus of FIG. 1 showing the hydraulic fluid reservoir, pump and motor for providing pressurized hydraulic fluid to the hydraulic cylinder through a closed recirculating system of lines.

Referring to FIG. 10, the hydraulic system 106 comprises all conventional components and includes the hydraulic cylinder 196 that is provided with pressurized hydraulic fluid from a hydraulic fluid reservoir 222, preferably located within the second horizontal frame 118, through a recirculating closed system of lines or hoses utilizing a pump 224 driven by a diesel or gas-powered engine 226. The output of the hydraulic pump 224 is controlled by a hydraulic control valve 228, also mounted to the second horizontal frame 118, that determines the direction and pressure of the hydraulic fluid in and out of the hydraulic cylinder 196 through a pair of flexible high-pressure lines 230 and 232 connected to the inlet/outlet ports of the hydraulic cylinder 196 by conventional quick connect connectors 234.

When pressurized hydraulic fluid is directed by the hydraulic control valve 228 through high pressure line 230 into the hydraulic cylinder 196, the first piston rod 216 is conventionally urged outwardly into an extended position. When pressurized hydraulic fluid is directed by the hydraulic control valve 228 through high pressure line 232 into the hydraulic cylinder 196, the first piston rod 216 is directed inwardly into a retracted position. Hydraulic fluid that is expelled from the hydraulic cylinder 196 is discharged back into the hydraulic fluid reservoir 222 through a return line 236. The hydraulic fluid reservoir 222 is provided with a filler pipe 238 for filling the hydraulic fluid reservoir 222 with hydraulic fluid. It should now be apparent to one skilled in the art that by using the second horizontal frame 118 as a hydraulic fluid reservoir 222, the need for an external hydraulic fluid tank is eliminated and a greater and more convenient working area is provided.

As shown in FIGS. 1, 2 and 10, operation of the baling portion 140 of the multi-purpose farm apparatus 100 is actuated by inserting a lock pin 240 through the aperture in the downwardly extending U-shaped cantilever bracket 212 of the second gib assembly 202 and into a corresponding aperture in the second rectangular tubular member 136 thereby locking the second gib assembly 202 in position. The first piston rod 216 is then fully retracted by activating the hydraulic cylinder 196 by moving the control lever of the hydraulic control valve 228 to slide the first gib assembly 180 rearwardly. As shown in FIGS. 2 and 9, a divider plate 242 (FIGS. 7 and 8) is positioned rearwardly of the formed bale 154b to separate the formed bale 154b from the contained bale 154a to be formed. Compressible baling material, such as straw or hay, is then deposited into the baling chamber 148 through the open rearward end of the baling chamber 148. The piston rod 216 is successively extended outwardly to slide the first gib assembly 180 forwardly against the material to be baled thereby compressing the material against the divider plate 242 and the end of a previously formed bale 154b. When the desired length of the constrained bale 154a is obtained, a second divider plate 242 is placed between constrained bale 154a and first pressure platen 188. The constrained bale 154a is then bound with bailing twine 244. As illustrated in FIGS. 5 and 6, the bailing twine 244 may be easily threaded using a horizontal configuration (FIG. 5) or a vertical configuration (FIG. 6) around the constrained bale 154a. Referring to FIGS. 7 and 8, the divider plate 242 includes a plurality of slots 246 to facilitate the threading of the bailing twine 244 across the ends of the formed bale 154a. As illustrated in FIG. 9, after the formed bale 154a is properly tied, the bale is pushed forwardly as the operator deems necessary. Newly formed bales 154a progressively expels preceding formed bales 154b outwardly through the open forward end 160 of the baling chamber 148. The first piston rod 216 is then retracted and the compacted bale is then retained in position to provide a head for compressing the next succeeding bale.

Figure 11:
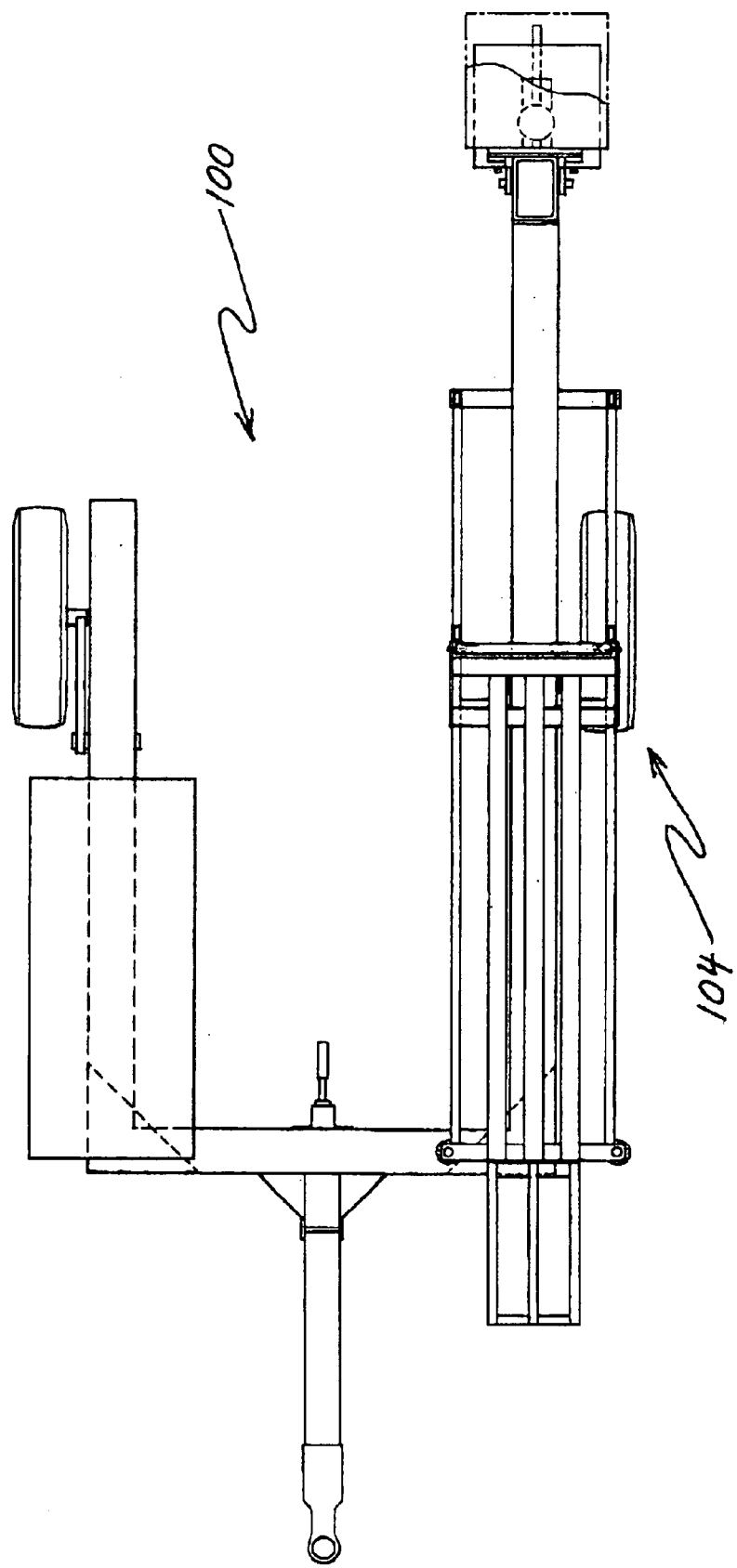
FIG. 11 is a top schematic view of the multi-purpose farm apparatus of FIG. 1 showing the combination baler and wood splitter apparatus having the combination baler and wood splitter apparatus in a vertical wood-splitting operation configuration.
Figure 12:
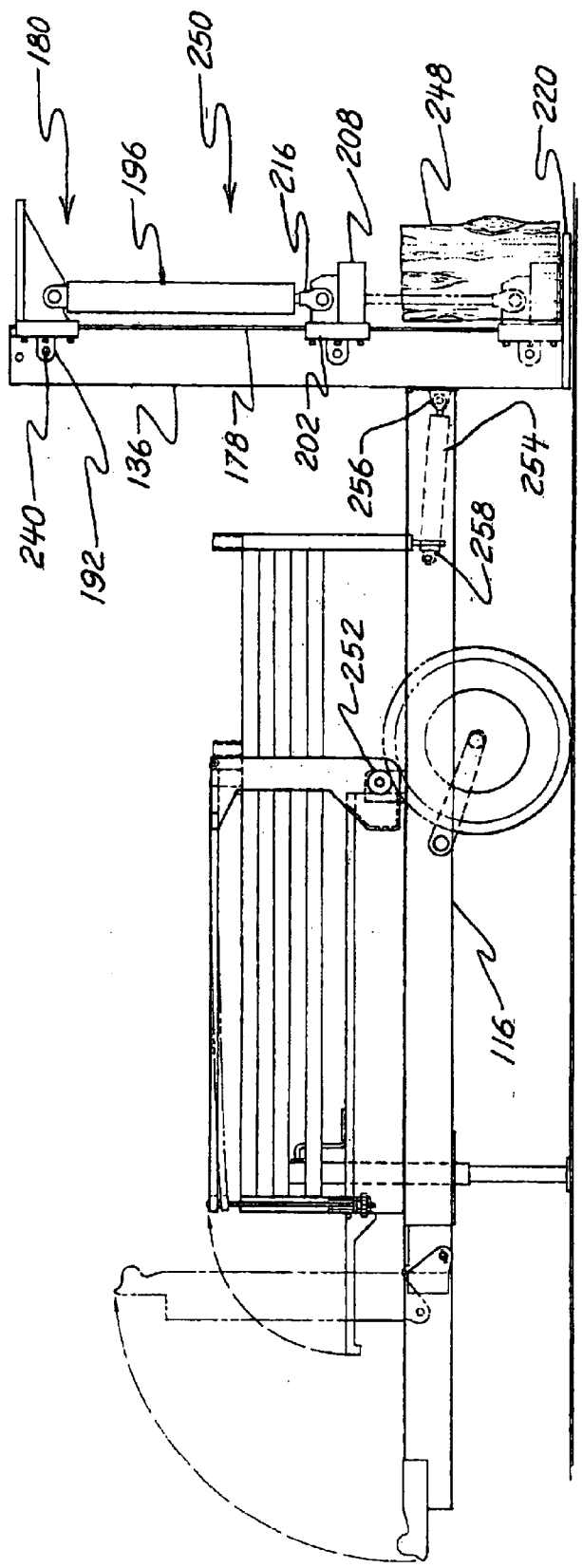
FIG. 12 is a side view of the multi-purpose farm apparatus of the present invention showing the combination baler and wood splitter apparatus of FIG. 1 in a vertical wood-splitting operation configuration.

Referring now to FIGS. 2, 11 and 12, the multi-purpose farm apparatus 100 may be converted into a wood splitting configuration by removing a lock pin 240 that fixedly secures the second gib assembly 202 in place and inserting the locking pin 240 through an aperture in the downwardly extending U-shaped cantilever bracket 192 of the first gib assembly 180 and into a corresponding aperture in the second rectangular tubular member 136 thereby permitting the second gib assembly 202 to slide longitudinally along the slider plate 178 while fixedly securing the first gib assembly 180 in place.

In operation, the piston rod 216 is fully retracted and a log to be split 248 is placed within the wood splitting portion 250 of the combination baler and wood splitter apparatus 104 between the splitting wedge 208 of the second gib assembly 202 and the anchor plate 220. The hydraulic cylinder 196 is then activated by moving the control lever of the hydraulic control device 228 to direct hydraulic fluid through high pressure line 230 and into the hydraulic cylinder 196 thereby urging the first piston rod 216 outwardly causing the second gib assembly 202 to slide rearwardly along the slider plate 178 to drive the splitting wedge 208 into and through the log 248 splitting it into two or more pieces.

The wood splitting portion 250 of the combination baler and wood splitting apparatus 104 can operate in a horizontal position, a vertical position, or any point there between, for splitting large, heavy logs into more manageable size. As shown in FIGS. 2 and 12, the second rectangular tubular member 136 is rotatably mounted by a conventional hinge and pin means 252 to the first horizontal frame 116 so that the second rectangular tubular member 136 may rotate relative thereto about an axis. A second conventional double-acting hydraulic cylinder 254 having a second piston rod 256 is operably interposed between the first horizontal frame 116 and the second rectangular tubular member 136. A clevis 258 is attached to the end of the hydraulic cylinder 254 and includes an aperture for cooperating with a conventional hinge and pin means 252 for rotatably securing the hydraulic cylinder 254 to the first horizontal frame 116. The outer end of the second piston rod 256 is pivotally secured to the second rectangular tubular member 136 by a second conventional hinge and pin means. The hydraulic cylinder 254 is activated either by removing the high pressure lines 230 and 232 from the hydraulic cylinder 196 and attaching the lines to the appropriate inlet and outlet ports of the hydraulic cylinder 254, or by use of a second hydraulic control valve and hydraulic lines (not shown) By moving the control lever of the hydraulic control device 228, hydraulic fluid may be directed into or out of the hydraulic cylinder 254 to extend or retract the second piston rod 256 thereby rotating the second rectangular tubular member 136 and the wood splitting portion 250 of the combination baler and wood splitting apparatus 104 mounted thereon about its longitudinal axis. It should be apparent to one skilled in the art that the quick-connect connectors 234 of the high pressure lines 230 and 232 allow for easy attachment to the hydraulic cylinder 196 to permit operation of the wood splitting portion 250 of the combination baler and wood splitting apparatus 104.

Figure 13:
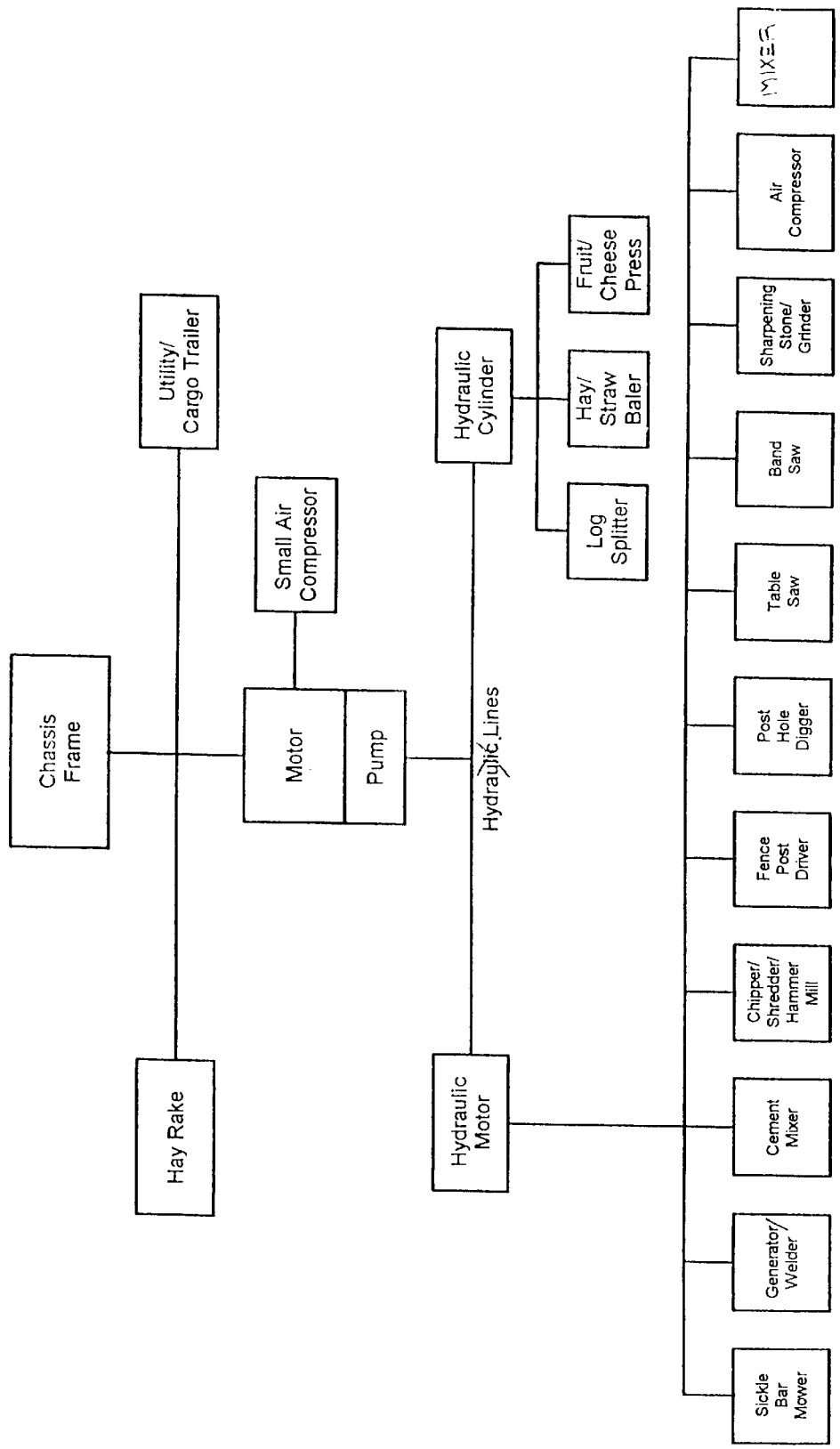
FIG. 13 is a schematic illustration of the multi-purpose farm apparatus of the present invention showing the various components and their combination.
Figure 26:
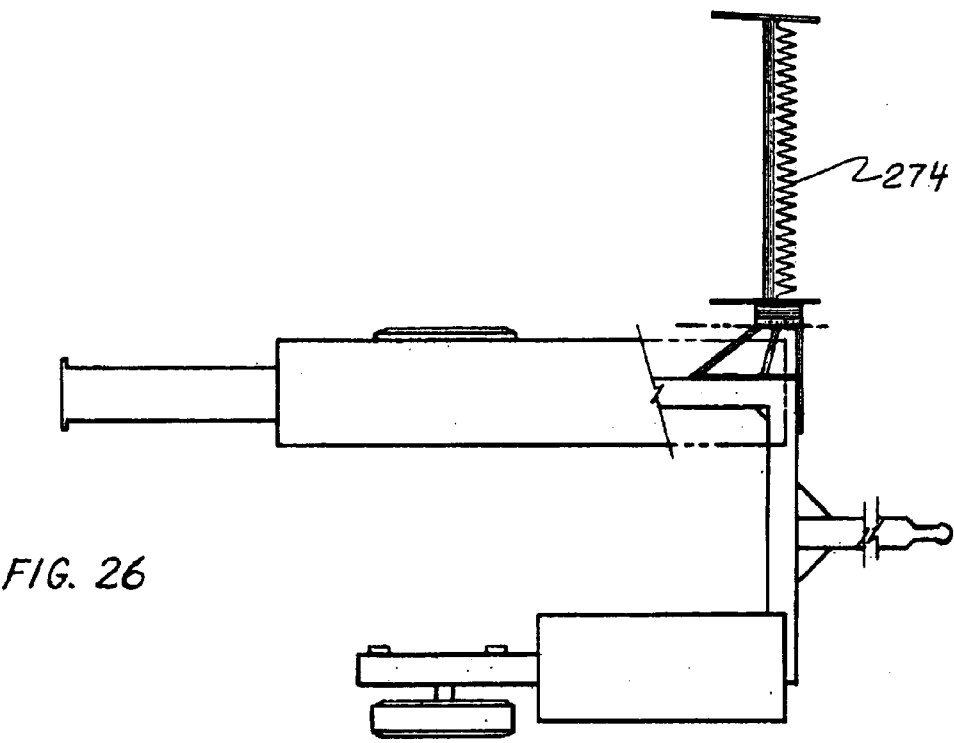
FIG. 26 is a top schematic view of the multi-purpose farm apparatus of the present invention showing conventional sickle bar mower equipment mounted thereon.
Figure 25:
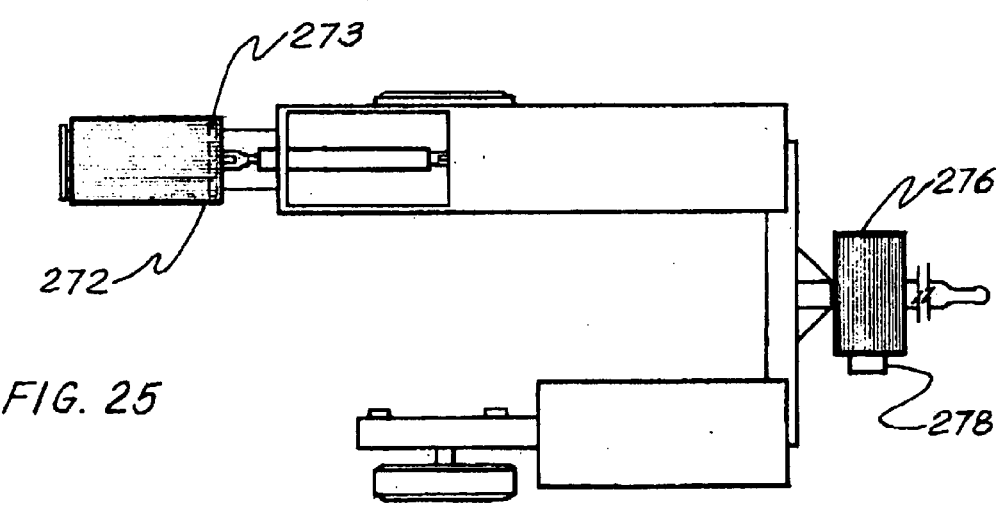
FIG. 25 is a top schematic view of the multi-purpose farm apparatus of the present invention showing conventional fruit or cheese press equipment and a conventional air, compressor mounted thereon.

It should now be apparent that the wood splitting portion 250 of the combination baler and wood splitting apparatus 104 may be easily modified for use as a press, such as a fruit or cheese press, by simply placing a conventional press chamber 272, such as a fruit or cheese press, and mounting a second pressure platen 273 within the press chamber (FIG. 13 and 25) to the splitting wedge 208.

As illustrated in FIGS. 13 through 26, the chassis frame 108 and the hydraulic system 106 of the multi-purpose farm apparatus 100 of the present invention is also easily adapted for use in mounting onto and operating various farm machinery. Until now, due to the cost of individual engines, hydraulic motors, and other similar equipment necessary to operate various farm equipment, such equipment was either relatively expensive or was not designed for extensive or commercial operation. However, it should also now be apparent that the portable hydraulic system of the present invention permits various farm machinery to be operated using a conventional hydraulic motor that may be removably mounted to the particular farm machinery being used.

Further, the use of conventional quick connect connectors permits the hydraulic motor to be easily and quickly connected to the hydraulic system. As illustrated in FIGS. 13 through 26, various hydraulically motor driven farm machinery such as a means for mixing 262, such as chemical mixer, feed mixer, and the like (FIGS. 13, 14 and 15); means for shredding 264, such as a conventional chipper, shredder, hammer mill, and the like (FIGS. 13, 16 and 17); concrete mortar mixer 266 (FIGS. 13, 18 through 21); means for sawing 268, such as a conventional table, band saw, and the like (FIGS. 13, 22 and 23); means for drilling 270, such as a post hole driller, fence post driver, and the like (FIGS. 13 and 24); means for pressing 272, such as a fruit press, cheese press, and the like (FIGS. 13 and 25); means for cutting 274, such as a sickle bar mower, hay rake, and the like (FIGS. 13 and 26); means for grinding 276, such as a sharpening stone or a conventional grinder (FIG. 13); and means for generating power 276, such as an air compressor, water pump, electrical generator, or electric welder (FIG. 13 and 25) may be attached to the chassis frame 108 and driven by the removable hydraulic motor 278 using the hydraulic system 106 of the multi-purpose farm apparatus 100 of present invention. While such examples illustrate specific systems which may be attached to the chassis frame, it should be understood that such examples are only exemplifications of the type of machinery that may be attached and are not intended to limit the invention to the particular equipment described. As previously stated, the various farm machineries are conventionally attached to the chassis frame 108, by bolts, crews and the like, or have a mounting plate 275 that is pressed between the anchor plate 220 and the splitting wedge 208 by extending the first piston rod 216 outwardly. A hydraulic motor 278 is conventionally mounted thereon and connected to the high pressure lines 230, 232 of the hydraulic system 106, using the quick connect connectors 234, for providing pressurized hydraulic fluid. The use of the chassis frame 108, the removable hydraulic motor 278, and the portable hydraulic system 106 significantly reduces the manufacturing cost of the various farm machinery. Further, by mounting such machinery onto the chassis frame 108 permits such machinery to be easily transported to a remote location.

In another preferred embodiment of the invention, as shown in FIGS. 27 through 31, the first and second horizontal frames 116 and 118, respectively, may each be provided with a horizontally extending rail or conventional brackets 280 for mounting a plurality of slats 282 there for supporting a flexible cargo mat 286. In operation, the cargo mat 286 may be extended over the slats 282 to provide a cargo bed 288 for transporting, tools, equipment, machinery, bales, logs and the like. As illustrated in FIG. 31, the flexible cargo mat 286 may be rolled up when not in use and may be stored within a first hanger 290 attached to the first horizontal frame 116. The slats 282 may also be removed and stored in a second hanger 292 attached to the second horizontal frame 118.

While the forms of apparatus described herein constitute preferred embodiments of this invention, it is to be understood that the invention is not limited to these precise forms of apparatus, and that changes may be made therein without departing from the scope of the invention which is defined in the appended claims.

What is claimed is:

1. A multi-purpose farm apparatus comprising:
   means for forming bales comprising a baling chamber;
   means for splitting logs,
   a portable hydraulic system for operating said means for forming bales, said means for splitting logs, and for expelling a formed bale out of said baleing chamber.

2. The multi-purpose farm apparatus of claim 1 further comprising a trailer for mounting said means for forming bales and said means for splitting logs and said portable hydraulic system.

3. The multi-purpose farm apparatus of claim 1
   wherein said means for forming bales comprises a baling chamber and a pressure platen reciprocal within said baling chamber,
   wherein said means for splitting logs comprises a splitting wedge adapted for reciprocal movement; and
   wherein said hydraulic system comprises a hydraulic cylinder and a reciprocating piston rod for effecting reciprocal movement of said pressure platen and said splitting wedge.

4. The multi-purpose farm apparatus of claim 1 further comprising means for pivoting said means for splitting logs into a substantially horizontal configuration and into a substantially vertical configuration.

5. The multi-purpose farm apparatus of claim 1 further comprising a trailer for mounting various farm machinery thereon and wherein said hydraulic system further comprising a hydraulic motor means for driving the various farm apparatus.

6. The multi-purpose farm apparatus of claim 1 further comprising a cargo bed.

7. A multi-purpose farm apparatus comprising:
   a trailer,
   a baler for forming a bale of material, said baler being positioned on said trailer;
   a wood splitter for splitting wood, said wood splitter being positioned on said trailer; and
   a hydraulic system;
   whereas said baler comprises a baling portion including a baling chamber having a floor, sides, a cover and a first opening for receiving material to be baled and a second opening for expelling a formed bale.

8. The multi-purpose farm apparatus of claim 7, whereas said baler further comprises a first gib assembly having a pressure platen mounted for reciprocal movement within said baling chamber for forming a bale and for expelling the formed bale;
   whereas said wood splitter comprises a second gib assembly mounted for reciprocal movement and includes a splitting wedge;
   whereas said first gib assembly and said second gib assembly each having means for mechanically coupling to said hydraulic system for moving said first gib assembly and said second gib assembly; and
   whereas said hydraulic system comprises a hydraulic cylinder and piston rod to effect reciprocal movement of said first gib assembly and said second gob assembly.

9. The multi-purpose farm apparatus of claim 7 wherein said hydraulic system further comprising an engine and a pump for supplying hydraulic fluid to said hydraulic cylinder, a reservoir for storing the hydraulic fluid, and a control means for controlling the supply of fluid to said hydraulic cylinder.

10. The multi-purpose farm apparatus of claim 7 wherein said hydraulic system further comprises a hydraulic motor means for attaching to and for driving a variety of farm machinery.

11. The multi-purpose farm apparatus of claim 7 farther comprising a concrete mortar means.

12. The multi-purpose farm apparatus of claim 7 further comprising means for pressing.

13. The multi-purpose farm apparatus of claim 7 further comprising means for mixing.

14. The multi-purpose farm apparatus of claim 7 further comprising means for shredding.

15. The multi-purpose farm apparatus of claim 7 further comprising means for drilling.

16. The multi-purpose farm apparatus of claim 7 further comprising means for sawing.

17. The multi-purpose farm apparatus of claim 7 further comprising means for drilling.

18. The multi-purpose farm apparatus of claim 7 further comprising means for cutting.

19. The multi-purpose farm apparatus of claim 7 further comprising means for grinding.

20. The multi-purpose farm apparatus of claim 7 further comprising means for generating power.

21. The multi-purpose farm apparatus of claim 7 wherein said baling portion comprises means for increasing and decreasing the cross section area of the baling chamber.

22. The multi-purpose farm apparatus of claim 7 wherein said hydraulic system further comprises a closed loop system of hoses having at least one high pressure line having a quick connect coupling adapted for attaching to said hydraulic cylinder.

23. The multi-purpose farm apparatus of claim 21 further comprising a cargo mat.

24. A multi-purpose farm apparatus comprising:

a trailer;

a combination baler and log splitter apparatus mounted to said trailer; and a hydraulic system;

wherein said trailer comprises a frame having a cross bar, a tongue portion extending in a forward direction from said cross frame, and generally first and second substantially horizontal frames extending in a rearward direction from said cross bar, and a trailer hitch attached to the forward end of said tongue portion for attaching to a vehicle;

wherein said combination baler and log splitter apparatus comprises a baling portion having a generally rectangular forward and rear frames, a plurality of spaced apart adjacent rails extending longitudinally between said forward and rear frames to form a generally rectangular cross sectional shaped baling chamber, and a first gib assembly mounted for reciprocal movement within said baling chamber;

wherein said combination baler and log splitter apparatus further comprises a log splitting portion having a second gib assembly having a splitting wedge and mounted to said trailer for reciprocating movement;

wherein said hydraulic system comprises a hydraulic cylinder having a reciprocating piston rod, a pump for providing pressurized hydraulic fluid to said hydraulic cylinder through a closed loop system of hoses, and a control means for controlling the supply of fluid under pressure to said hydraulic cylinder;

wherein said hydraulic cylinder and said piston rod are mechanically coupled to said first gib assembly and said second gib assembly to effect reciprocating movement.

25. The multi-purpose farm apparatus of claim 24 wherein said hydraulic system further comprises a hydraulic motor means for attaching and detaching to farm machinery.

26. The multi-purpose farm apparatus of claim 24 wherein the cross sectional area of said baling chamber may be increased or decreased.

* * * * *